(12) United States Patent
Voss et al.

(10) Patent No.: US 10,878,084 B1
(45) Date of Patent: Dec. 29, 2020

(54) SECURE SYNCHRONIZATION AND MANAGEMENT OF RECOVERY DATA FOR BACKUP SYSTEMS

(71) Applicant: EMC IP Holding Company LLC, Hopkinton, MA (US)

(72) Inventors: Stefan Voss, Milton, MA (US); Sadagopan Balaraman, Franklin, MA (US); Stephen Walsh, Milford, MA (US); Anthony Mullen, Broomfield, MA (US); Eddie Pavkovic, Westford, MA (US); Allen Yen, Fremont, CA (US); Andrew VanDamme, Ashland, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 34 days.

(21) Appl. No.: 16/425,071

(22) Filed: May 29, 2019

(51) Int. Cl.
*G06F 21/53* (2013.01)
*G06F 11/14* (2006.01)
*G06F 8/61* (2018.01)
*G06F 16/23* (2019.01)
*G06F 21/57* (2013.01)
*G06F 16/27* (2019.01)

(52) U.S. Cl.
CPC .............. *G06F 21/53* (2013.01); *G06F 8/61* (2013.01); *G06F 11/1469* (2013.01); *G06F 16/2343* (2019.01); *G06F 16/27* (2019.01); *G06F 21/577* (2013.01); *G06F 2201/82* (2013.01); *G06F 2221/033* (2013.01)

(58) Field of Classification Search
CPC ........ G06F 21/53; G06F 21/577; G06F 16/27; G06F 11/1469

USPC .......................................................... 726/25
See application file for complete search history.

(56) References Cited

U.S. PATENT DOCUMENTS

| | | | |
|---|---|---|---|
| 8,335,768 B1* | 12/2012 | Desai | G06F 11/1448 707/674 |
| 10,635,838 B1* | 4/2020 | Shemer | H04L 63/10 |
| 2011/0087874 A1* | 4/2011 | Timashev | G06F 11/1446 713/100 |
| 2013/0212437 A1* | 8/2013 | Timashev | G06F 11/1448 714/37 |
| 2014/0289566 A1* | 9/2014 | Timashev | G06F 11/1469 714/38.1 |
| 2018/0253361 A1* | 9/2018 | Dhatrak | G06F 11/1469 |

\* cited by examiner

*Primary Examiner* — Teshome Hailu
(74) *Attorney, Agent, or Firm* — Dergosits & Noah LLP; Todd A. Noah

(57) ABSTRACT

Described is a system for secure management of recovery data for data protection assets such as backup data and a backup application of a production backup system. The system may provide the ability to synchronize and secure critical recovery data of an isolated recovery environment. Accordingly, the system may reduce the breadth of potential cyber security attack vectors and increase the likelihood of efficiently recovering critical data and/or applications. To provide such capabilities, the system may only activate a data connection between a production system and a recovery system when synchronizing recovery data. In addition, the system may apply a retention lock to maintain a set of immutable copies of the recovery data and may restore the recovery data to a sandboxed environment where it may be tested and verified before being deployed to the production system as part of a recovery process.

20 Claims, 5 Drawing Sheets

SECURE SYNCHRONIZATION AND MANAGEMENT OF RECOVERY DATA FOR BACKUP SYSTEMS

TECHNICAL FIELD

This disclosure relates to managing data protection assets, and more particularly, minimizing the potential exposure of data protection assets to various cyber security threats.

BACKGROUND

A data backup and recovery system may provide various tools that are crucial for enterprise level network clients. Clients may rely on such systems to efficiently back up and recover data in the event of user error, data loss, system outages, hardware failure, or other catastrophic events to allow business applications to remain in service or quickly come back up to service. As with all computing systems, backup and recovery systems must be concerned with various cyber security threats which may threaten production backup environments. For example, cyber security threats such as malware or ransomware have relied on various attack vectors to target data protection assets that have resulted in lengthy recovery procedures, or in some instances, the inability to recover data protection assets. For example, an attack vector may include a path or means by which a malicious party (e.g. hacker) can gain access to a computer or network and deliver a payload that exploits system vulnerabilities. Indeed, current products exist that attempt to protect against various cyber security threats. However, these products (or systems) often rely on highly connected components that do not adequately reduce the breadth of potential attack vectors. In addition, these product often rely on security features built into components that reside on the production side of a network. Moreover, cyber-attacks often target an array of data protection assets including the backup software itself which remains exposed with other components of the production system. Accordingly, there is a continued need to minimize the susceptibility of backup and recovery systems to potential cyber-attack vectors.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Figure 1:
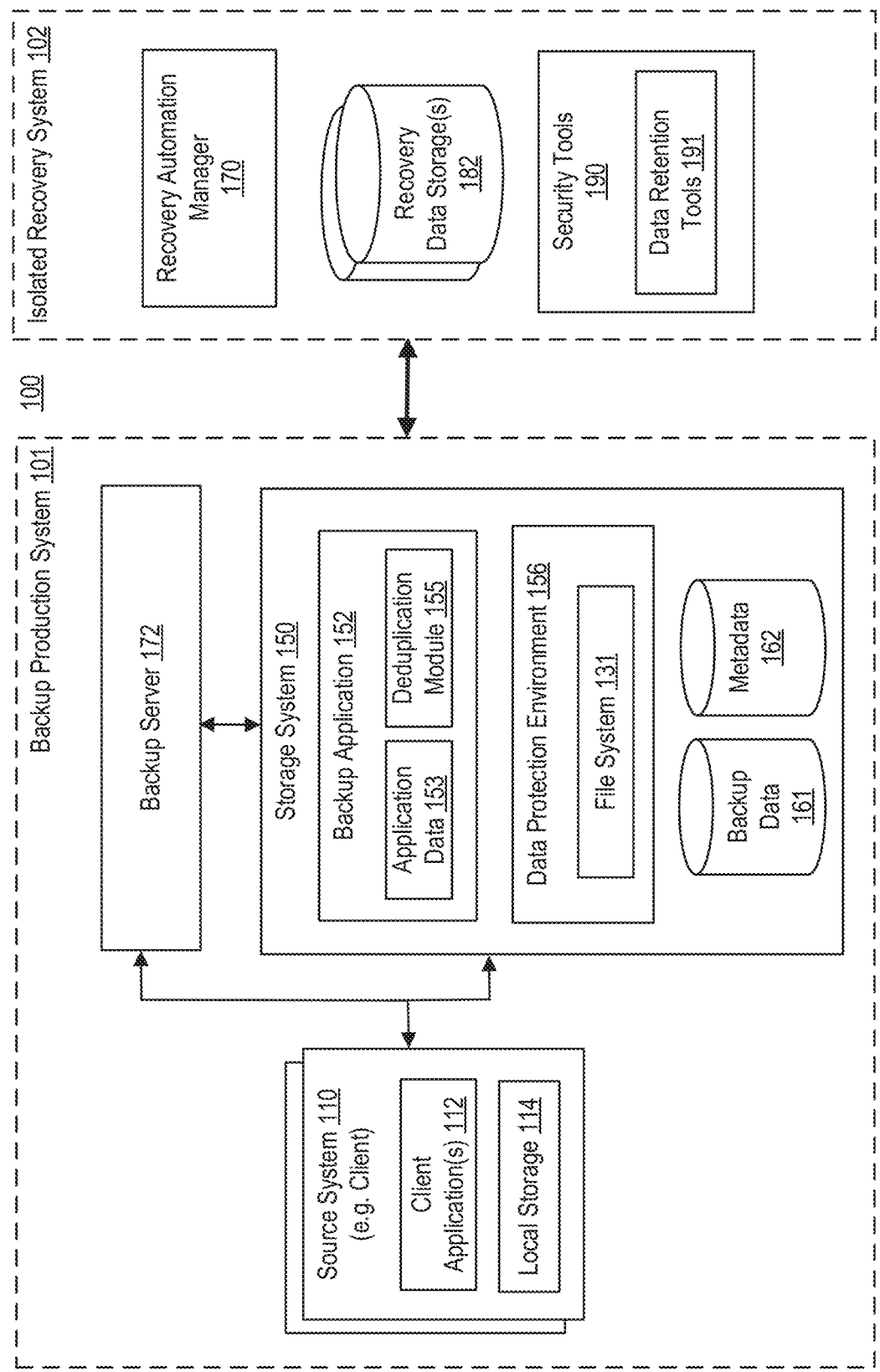
FIG. 1 is a block diagram illustrating an example of an operating environment that may be used in conjunction with one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) that provides a mechanism for secure synchronization and management of recovery data for data protection assets of a production backup system. For example, the system provides the ability to synchronize and secure critical recovery data into an isolated recovery environment (or dark site, cyber-recovery vault, etc.). Accordingly, the system may reduce the breadth of potential cyber security attack vectors and increase the likelihood of efficiently recovering critical data and/or applications.

To provide such capabilities, the system may implement a secure synchronization and management process of recovery data. For example, in some embodiments, the system may activate a data connection between a production backup system and an isolated recovery system and initiate a transfer of data to synchronize recovery data stored by the isolated recovery system. The recovery data may include recovery data for data protection assets such as backup data and application data (e.g. metadata) associated with a backup application. After synchronization, the system may then deactivate the data connection to limit potential security threats that may originate within the production environment. Accordingly, a single data connection may only be activated when performing synchronization to ensure a minimal external attack surface. In addition, the system may apply a retention lock to maintain a set of immutable copies of the recovery data. The recovery data may then be restored to a sandboxed environment within the isolated recovery system where it may be tested and verified before being deployed to the production system as part of a recovery process.

In addition, the system may automate such a procedure from a secured automation component within the isolated system. By utilizing the automation component of the secure and isolated environment, a security threat cannot access the automation component even if the threat is aware of such a component. Accordingly, in some embodiments, described is a mechanism that minimizes the breadth of potential attack vectors to data protection assets and provides a secure process for recovering critical data for such assets.

In some embodiments, such a system may be provided within an operating environment. An example of such an operating environment is further described herein with reference to FIG. 1. However, in general, embodiments of the disclosure may include and/or be implemented in an operating environment including a cloud services environment that may be, or include, a data protection operating environment that includes a storage environment including primary storage and data protection storage. For example, at least some functionality may be provided by, or implemented in connection with, various platforms such as the Dell/EMC Data Domain™ data protection platform, and associated systems, methods, and components, although use of this particular platform is provided only by way of illustration and is not required.

In one embodiment, the storage environment may take the form of a cloud storage environment. However, embodiments of the disclosure may also be implemented for an on-premises storage environment, and hybrid storage environments that include public and private elements, as well as any other type of storage environment. In addition, any of these cloud environments, or other operating environments, may take the form of an operating environment that is partly, or completely, virtualized. The storage environment may include one or more host devices that each host one or more applications used by a client of the storage environment. As such, a particular client may employ, or otherwise be associated with, one or more instances of each of one or more applications. In general, the applications employed by the clients are not limited to any particular functionality or type of functionality. Some example applications may include database applications (e.g. a SQL Server), filesystems, as well as data stores such as Oracle databases for example. The applications on the clients may generate new and/or modified data that is desired to be protected.

Any of the devices, including the clients, servers and hosts, in the operating environment can take the form of software, physical machines, or virtual machines (VM), or any combination thereof, though no particular device implementation or configuration is required for any embodiment. Similarly, data protection system components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

More specifically, and with reference to FIG. 1, shown is a block diagram illustrating an example of an operating environment 100 according to one or more embodiments of the disclosure. As shown, the environment 100 may include a production backup system 101 and an isolated recovery system 102. The production backup system 101 may include components that are live and/or used for providing services by the customer of a data storage service. For example, the production backup system 101 may include a source system 110 that provides computing resources (e.g. webservers, databases, etc.) for customers (e.g. website visitors) of the customer of the data storage service. It should be noted that the components of operating environment 100 may interact via a network, which may be any type of wired or wireless network including a local area network (LAN), a wide area network (WAN), or a direct communication link, or other suitable connection. In some embodiments, the production backup system 101 may be connected to the isolated recovery system 102 via a data connection which may be activated or deactivated as further described herein.

As shown, the operating environment 100 may include a client or source system (or computer, or device) 110 that may be associated with a customer of a storage service and a storage system 150 that may be associated with a storage service provider. In some embodiments, the source system 110 may act as a client from which backups are performed. In some embodiments, the source system 110 may comprise a virtual machine. The source system (or computer, device, etc.) 110 may host one or more client applications 112, and may include local storage 114, as well as an interface for communicating with other systems and devices, such as the storage system 150. In general, the client applications 112 may create new and/or modified data that is desired to be protected. As such, the source system 110 is an example of a host device. The local storage 114 can be used to locally store data, which may, along with the source system 110 itself be backed up using the storage system 150. The backed-up data can be restored to the local storage 114. The source system 110 may include a backup client application that cooperates with storage system 150, to create backups of client data, which may include backup data 161. As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc.

In one embodiment, storage system 150 may represent one or more components of a Data Domain™ Restorer (DDR)-based deduplication storage system, and backup server 172 may be implemented in conjunction with a Data Domain deduplication storage server provided by Dell/EMC™ Corporation for use with DDR storage devices. For example, the backup server 172 may be a stand-alone entity, or can be an element of the environment 100. In some embodiments, the backup server 172 may be an EMC Corp. Avamar server or an EMC Corp. Networker server, although no particular server is required, and other backup and storage system configuration are contemplated.

The storage system 150, may include a backup application 152. Accordingly, data to be backed-up may be communicated from the source system 110 to the storage application 152 for initial processing, after which the processed data is uploaded from the storage application 152 for storage at the data protection environment 156 (e.g. as backup data 161). In some embodiments, the backup application 152 may cooperate with a backup client application of the source system 110 to back up client data to the data protection environment 156. A backup application 152 may also cooperate with a backup client application to restore backup data from the data protection environment 156 to the source system 110. In some embodiments, the storage application 152 may be a part of, or work in conjunction with, a storage appliance. For example, the storage appliance may include a Dell-EMC CloudBoost appliance, although any suitable appliance is contemplated. In addition, the storage application 152 (or appliance) may provide a variety of useful functionalities such as source-side data deduplication, data compression, and WAN optimization boost performance and throughput while also possibly reducing the consumption and cost of network bandwidth and cloud storage capacity. One, some, or all, of these functions of the storage application 152 may be performed using deduplication logic via deduplication module 155. For example, the deduplication module 155 can provide data segmentation, as well as in-flight encryption as the data is sent by the storage appliance 152 to the data protection environment 156.

The isolated recovery system 102 may also store application data (or backup application data) 153. The application data 153 may include data or metadata associated with the backup application 152. For example, the application data 153 may include data that may include information such as settings, profiles, attributes, etc. for the backup application 152. In addition, the application data 153 may include metadata associated with a backup procedure such as last backup time, backup schedule, data to-be-backed-up, or any other information relied upon by the backup application 152 to perform a backup procedure. In some embodiments, the application data 153 may be stored as part of data 161. In addition, application data 153 may include various files such as configuration files. For example, a security threat may infiltrate, or attempt to infiltrate, such application data 153 to disrupt the security and/or function of the backup application 152 itself. As a result, the application data 153 may be stored as part of the recovery data that may be tested or verified within a secure environment as further described herein.

The data protection environment 156 may store metadata 162 for the data 161 and include one or more instances of a filesystem 131 that catalogs files and other data residing in the data protection environment 156. In general, the storage of backup data 161 may be configured to store source system 110 data backups that can be restored in the event of a loss of data. The term data backups is intended to be construed broadly and includes, but is not limited to, partial backups, incremental backups, full backups, clones, snapshots, any other type of copies of data, and any combination of the foregoing. Any of the foregoing may, or may not, be deduplicated. The storage of data can employ any suitable storage technique, infrastructure, hardware (e.g. Solid State Drive (SSD), Hard Disk Drive (HDD)), or on virtual storage systems provided by a cloud service provider etc.

The isolated recovery system 102 may include an isolated and/or secure environment that is separate from the production backup system 101. In some embodiments, the isolated recovery system 102 may be part of one or more physical servers that are provided as part of a cloud-computing service that is provided by a different entity than the entity that provides the production backup system 101. For example, the production environment 101 may be provided as part of Dell/EMC Data Domain™ data protection platform and the isolated recovery system 102 may be provided by a different entity (e.g. Amazon Web Services (AWS) platform, Microsoft Azure platform, etc.). Accordingly, in some embodiments, the isolated recovery system 102 may be provided as part of a user-account managed by the different entity (e.g. Amazon, Microsoft, etc.). Accordingly, the system described herein may provide the customer with the ability to efficiently and seamlessly interact with the different entity that provides the on-demand infrastructure (e.g. Infrastructure as a Service (IaaS)) for the isolated recovery system 102.

The isolated recovery environment may include one or more recovery data storage(s) 182. The recovery data storage 182 may store recovery data used to recover data protection assets such as backup data 161, application data 153, or the backup application 152 itself. In addition, the recovery data may also store data to recover additional data protection assets that are part of the backup production system 101 (e.g. other backup server 172 or storage system 150 components).

The recovery automation manager 170 may coordinate (or manage, orchestrate, automate, etc.) a workflow (or process) for performing a secure synchronization and management of recovery data for data protection assets as further described herein. In some embodiments, the recovery automation manager 170 may perform such a process according to a predefined security policy. For example, the recovery automation manager 170 may determine when synchronization of recovery data is necessary, perform data connection management (activating/deactivating replication ports), manage synchronization, restore recovery data, access various security tools, perform testing and verification of recovery data, and/or restore data within the production environment. As shown, the recovery automation manager 170 may itself be contained within a secure environment (e.g. the isolated recovery system 102). Accordingly, in some embodiments, the processes as further described herein may be performed in a secure and automated manner by having the coordination managed by a single secure component. Accordingly, the utilization of a recovery automation manager 170 may minimize the breadth of potential attack vectors to data protection assets.

In addition, the isolated recovery system 102 may include various security tools 190. These tools may include various software components, APIs, libraries, classes, etc. to implement additional security features or capabilities within the isolated system. For example, the isolated recovery system 102 may include data retention tools 191. These retention tools 191 may ensure that immutable copies of recovery data remain persistent for a predetermined amount of time. For example, the data retention tools 191 may ensure that all the data (e.g. files) that are locked for a time-based retention period cannot be deleted or overwritten under any circumstances until the retention period expires. To provide such capabilities, the tools may implement various features or policies such as requiring dual sign-on procedures for certain administrative actions. For example, a dual sign-on (or verification) procedure may require a regular system administrator sign-on (or verification) plus a second authorized person (e.g. a "Security Officer") to perform certain administrative operations associated with the locked recovery data. The dual sign-on requirement may ensure that certain administrative actions are under the purview and control of a higher authority above and beyond the system administrator. In addition, the retention tools 191 may also implement various other policies such as disallowing operations that could compromise the state of locked data, securing the system clock from illegal updates, audit logging for any operations that are executed upon the locked data, disabling various "doors" of access that could compromise the state of the locked data or the state of the retention attributes, or other security policies. In some embodiments, the data retention tools 101 may include Dell EMC Data Domain Retention Lock® (DD Retention Lock) components, although any suitable set of tools are contemplated. In some embodiments, retention tools 191 may be compatible with various industry-standards, such as NAS-based (CIFS, NFS) Write-Once-Read-Many (WORM) protocols.

As described, the isolated recovery system 102 may provide a secure infrastructure for synchronizing, restoring and verifying recovery data as further described with reference to FIG. 2.

Figure 2:
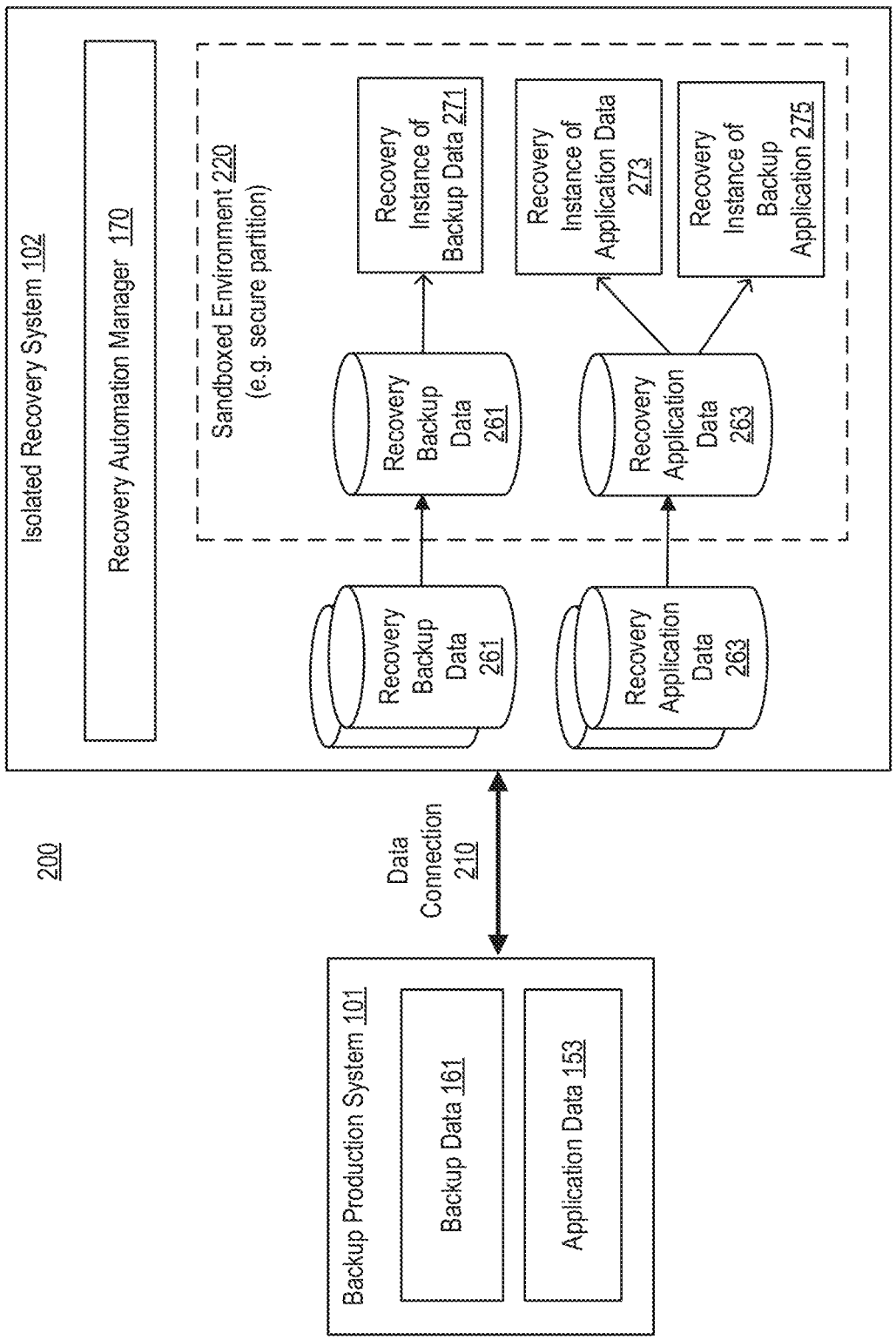
FIG. 2 is a block diagram illustrating an example system providing a secure infrastructure for synchronizing, restoring, and verifying recovery data according to one or more embodiments of the disclosure.

FIG. 2 is a block diagram 200 illustrating an example system providing a secure infrastructure for synchronizing, restoring, and verifying recovery data according to one or more embodiments of the disclosure. As shown, the backup production system 101 may maintain backup data 161 and application data 153. The backup production system 101 may be connected to the isolated recovery system 102 via a data connection 210. The data connection 210 may be a suitable wired or wireless network (or data) connection. In some embodiments, the data connection 210 may be a particular network port such as a replication port. In some embodiments, the data connection 210 may be the only data connection between the two systems.

As described, the isolated recovery system 102 may include a recovery automation manager 170. Accordingly, the recovery automation manager 170 may itself be contained within a secure environment (e.g. separate from the production environment). The isolated recovery system 102 may store recovery data including recovery backup data 261 and recovery application data 263, each of which may be stored within one or more recovery data storages 182. The recovery backup data 261 may be a copy of the backup data 161, and the recovery application data may be a copy of the application data 153. In some embodiments, each of the recovery backup data 261 and the recovery application data 263 may be stored as part of a set of copies (or instances) that correspond to recovery data at various points of time. For example, the recovery backup data 261 may correspond to instances of the backup data 161 at a set of time points. Similarly, the recovery application data 263 may correspond to instances of the application data 153 at a set of time points. For example, the backup data 161 and/or the application data 153 may include multiple instances (or versions) corresponding to a backup schedule (e.g. hourly, daily, etc.). In some embodiments, the corresponding recovery backup data 261 and recovery application data 263 may include corresponding instances (e.g. hourly, daily, etc.) that are created or maintained according to a synchronization schedule. Alternatively, the recovery backup data 261 and recovery application data 263 may store instances at different time points. For example, the backup data 161 and application data 153 may include instances that are backed up on an hourly schedule, and the recovery backup data 261 and recovery application data 263 may be synchronized on a daily schedule. In some embodiments, synchronizing the recovery data may include creating a new copy of the recovery data. In addition, recovery data may be stored in an efficient manner (e.g. deduplicated) by storing only the differences between instances, and accordingly, may also be associated with metadata.

As part of a recovery process, the recovery backup data 261 and/or the recovery application data 263 may be restored. In some embodiments, restoring data may include rehydrating recovery data that may be stored in an efficient manner. For example, rehydrating data may include performing processes to reverse various procedures implemented to store recovery data. For instance, when initially storing recovery data, the recovery data may be compressed, deduplicated, and/or encrypted. Accordingly, rehydrating data may include reversing such a process to restore recovery data to a usable state.

To provide an additional layer of security, the recovery backup data 261 and/or recovery application data 263 may be restored to the sandboxed environment 220. In some embodiments, the sandboxed (or virtual sandbox) environment 220 may include a secure partition within the isolated recovery system 102. In general, a sandboxed (or isolated, secure, restricted, test, etc.) environment may provide a security mechanism for isolating data or applications and thereby limiting risk to a host machine or operating system. For example, the sandbox may provide a tightly controlled set of resources and restrict access to memory, network, kernel procedures, and other components of the isolated recovery system 102. Accordingly, the sandboxed environment 220 may be used to test unverified recovery data that may have been exposed to security threats such as viruses, ransomware, or other malicious code.

In some embodiments, the restored recovery data may be used to create one or more recovery instances of the data protection assets. As shown, the recovery backup data 261 may be recovered to create a recovery instance of the backup data 271. For example, the recovery instance of the backup data 271 may include usable data (e.g. rehydrated backup data) that may be tested and verified before being provided (or deployed, transferred, etc.) to the production environment. In addition, as shown, the recovery application data 263 may be restored to create a recovery instance of the application data 273 and/or create a recovery instance of the backup application 275. For example, the recovery instance of the application data 273 may include the original data (e.g. metadata, configuration files, etc.) associated with the backup application that may be tested and verified before being provided to the production environment. In addition, the recovery application data 263 (e.g. metadata, configuration files, etc.) may be used in conjunction with installation files to create a recovery instance of the backup application 275. For example, the isolated recovery system 102 may store secure installation files (or data) of the backup application (e.g. backup application 152). In some embodiments, the backup application or installation files may be obtained from an external source such as from the backup application provider. For example, in some embodiments, a generic (or "off-the-shelf") version of the backup application may be installed from the installation files and the recovery application data 263 may create a customized version of the backup application (e.g. for a particular customer or system) to be tested within the isolated recovery system 102.

In addition, in some embodiments, a particular instance of the recovery data may be restored based on a time point associated with a security threat. For example, if a security breach occurred at time X, the one or more recovery data instances selected to be restored may correspond to a time point prior to time X. As another example, the recovery data instances may also include a time point after X. For instance, a backup application may be restored using recovery application data that was synchronized after time point X, and accordingly, the system may perform various tests or apply patches within the sandboxed environment 220 to address any security threats (e.g. viruses or malware).

Accordingly, such an infrastructure (or system) may be utilized to perform a specialized process to manage recovery assets as further described with reference to FIG. 3.

Figure 3:
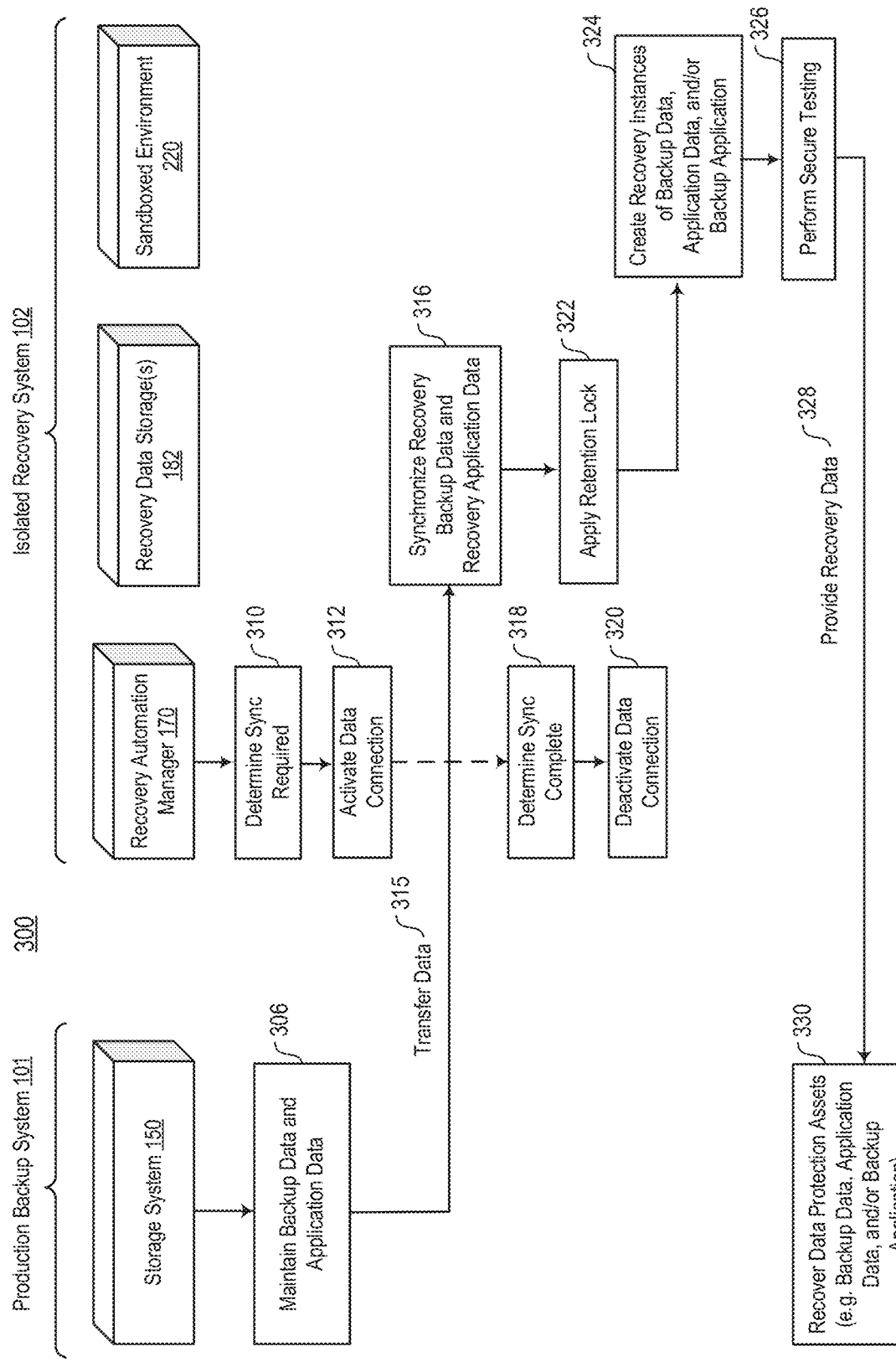
FIG. 3 is a diagram illustrating an example interaction between components as part of a process to securely synchronize and manage recovery data according to one or more embodiments of the disclosure.

FIG. 3 is a diagram 300 illustrating an example interaction between components as part of a process to synchronize and manage recovery data according to one or more embodiments of the disclosure. As shown, diagram 300 shows an example interaction between components of the production backup system 101 and components of the isolated recovery system 102. In 306, the storage system 150 may maintain data protection assets such as backup data (e.g. backup data 161) and application data (e.g. application data 153). In 310, the recovery automation manager 170 may determine whether synchronization is required for the recovery backup data (e.g. recovery backup data 261) and/or the recovery application data (e.g. recovery application data 253). The determination on whether a synchronization is required may be based on several criteria. In some embodiments, the recovery automation manager 170 may initiate the synchronization based on a predefined schedule to ensure the recovery data is up-to-date. In some embodiments, the synchronization (e.g. based on a schedule) may be adjusted (e.g. enabled/disabled) based on the potential of a security threat. For example, the recovery automation manager 170 may receive an indication that the production backup system 101 may be exposed to a security threat, and in response, may forgo (or disable, skip, prevent, etc.) the synchronization to avoid potential exposure of the isolated recovery system 102 to the security threat. In 312, the recovery automation manager 170 may activate (or enable, open, allow access, etc.) a data connection (e.g. data connection 210) between the production backup system 101 and the isolated recovery system 102. To minimize the breadth of potential attack vectors, components of the production backup system 101 (e.g. storage system 150, backup server 172, etc.) may only be allowed access to the isolated recovery system 102 during the window of time that the data connection is activated. In 315, the production backup system 101 may transfer data to the recovery data storage(s) 182 maintained by the isolated recovery system 102. The transfer of data may be performed in a secure manner (e.g. by encrypting the data) and may include the data necessary to perform a synchronization of recovery data stored by the isolated recovery system 102. After receiving the data, in 316, the recovery backup data may be now be synchronized with the backup data, and the recovery application data may now be synchronized with the application data.

In 318, the recovery automation manager 170 may determine when the synchronization is complete. In response to determining the synchronization is complete, in 320, the recovery automation manager 170 may deactivate (or disable, close, deny access, etc.) the data connection. For example, the data connection may be immediately deactivated upon completion of the transfer of data. In some embodiments, the data connection may be the only access path to the isolated recovery system 102 from the production backup system 101. Moreover, the data connection may be the only access point for any external system to the isolated recovery system 102. Accordingly, in some embodiments, deactivating the data connection can effectively close all access paths to the isolated recovery system 102, and thereby effectively avoid potential attack vectors that may originate from an external system.

In 322, the isolated recovery system 102 may apply a retention lock to the recovery backup data and recovery application data. In some embodiments, recovery automation manager 170 may manage and/or apply such a retention lock. Accordingly, immutable copies of the recovery backup data and recovery application data may be preserved for a predetermined amount of time.

As described, a sandboxed environment may be utilized to provide an additional layer of security. Accordingly, in 324, the system may create a recovery instance of the backup data, application data, and/or the backup application itself within the sandbox environment. Once such recovery instances are created in a sandboxed environment, in 326, the system may perform various tests or verifications within the secure environment to ensure that the recovery data (or backup application) has not already been comprised by various security threats, or potentially susceptible to such threats. Once any security testing or verification processes have been performed in the sandbox environment, in 328, the isolated recovery system 102 may provide the recovery data to the production backup system 101. In some embodiments, the recovery data may be provided by the same data connection. Moreover, the recovery automation manager 170 may activate the data connection to provide such data and deactivate (or immediately deactivate) the data connection once the transfer is complete. Once the recovery data is received by the production backup system 101, in 330, various data protection assets may be recovered. For example, the backup data, application data, and/or the backup application may be recovered.

It should be noted that one or more operations of diagram 300 may be performed by, or initiated by, the recovery automation manager 170. Accordingly, the recovery process and infrastructure may be managed in a secure and automated manner by having the coordination managed by a single secure component. Accordingly, the system may minimize the breadth of potential attack vectors to data protection assets within a production environment.

Figure 4:
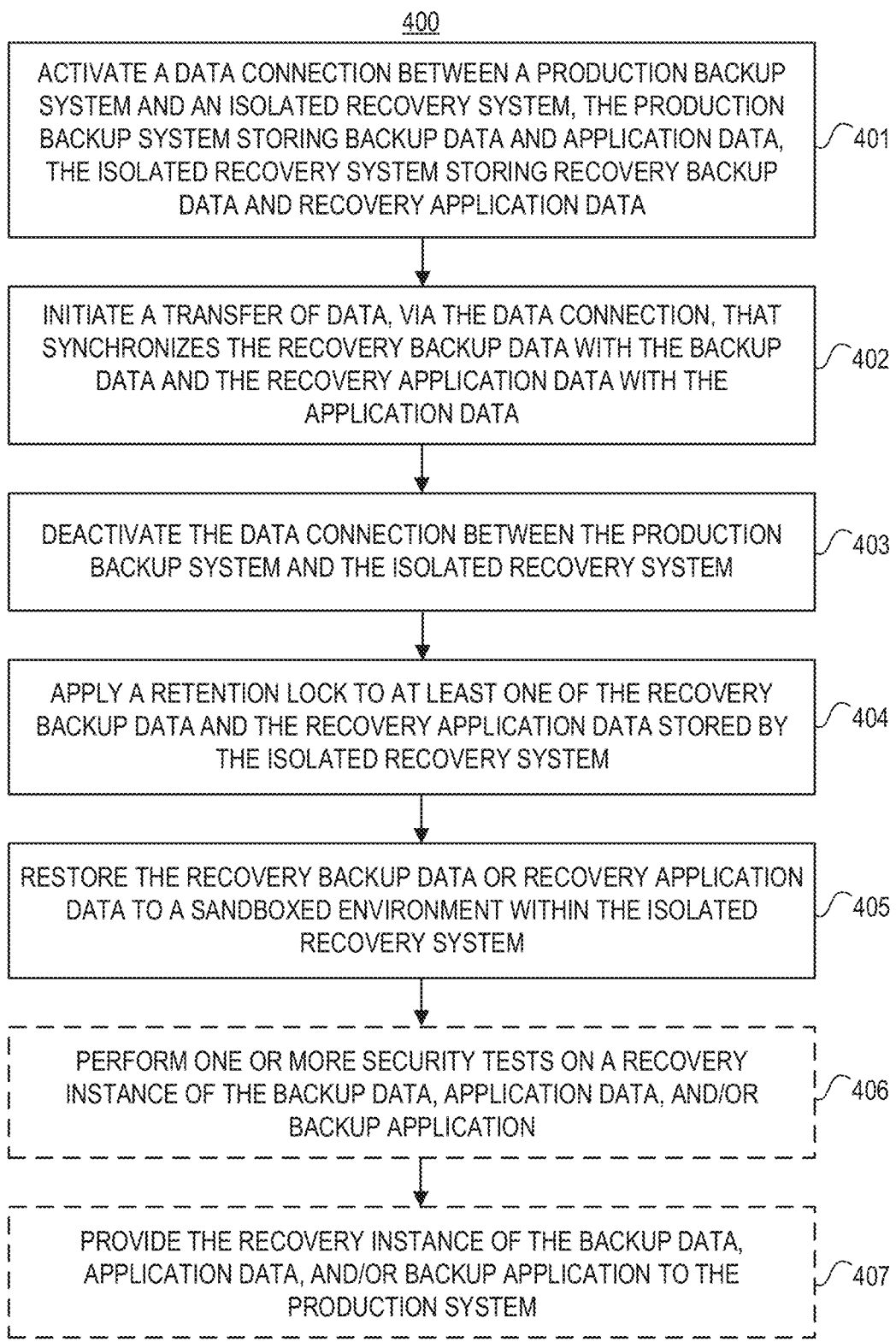
FIG. 4 is a flow diagram illustrating an example method of securely synchronizing and managing recovery data according to one or more embodiments of the disclosure.

FIG. 4 is a flow diagram illustrating an example method of securely synchronizing and managing recovery data according to one or more embodiments of the disclosure. Process 400 may use processing logic, which may include software, hardware, or a combination thereof. For example, process 400 may be performed by a system including one or more components described in operating environment 100 (e.g. automation manager 170, isolated recovery system 102, etc.).

In 401, the system may activate a data connection (e.g. data connection 210) between a production backup system (e.g. production backup system 101) and an isolated recovery system (e.g. isolated recovery system 102). As described, the production backup system may store backup data (e.g. backup data 161) associated with a source system (e.g. source system 110). In addition, the production backup system may store application data (e.g. application data 153) associated with a backup application (e.g. backup application 152) that manages the backup data. As described, the isolated recovery system may store recovery backup data (e.g. recovery backup data 261) comprising a copy of the backup data and recovery application data (e.g. recovery application data 253) comprising a copy of the application data.

In 402, the system may initiate a transfer of data from the production backup system to the isolated recovery system that synchronizes the recovery backup data with the backup data and the recovery application data with the application data. The transfer of data may be performed via the activated data connection. In some embodiments, each of the recovery backup data and the recovery application data are stored as part of a set of copies that correspond to the backup data and the application data at a set of time points.

In 403, the system may deactivate the data connection between the production backup system and the isolated recovery system. Accordingly, the deactivation may prevent access to the isolated recovery system from the production environment. For example, the system may deactivate the data connection in response to determining the synchronization is complete.

In 404, the system may apply a retention lock to the recovery data stored within the isolated recovery system. For example, the system may apply a retention lock to at least one of the recovery backup data and the recovery application data stored by the isolated recovery system. The retention lock may ensure the recovery data persists for a predetermined time (or retention time). In some embodiments, applying the retention lock may include requiring a dual sign-on or verification procedure to perform administrative operations associated with the locked recovery data. For example, a dual sign-on (or verification) procedure may require a regular system administrator sign-on (or verification) plus a second authorized person (e.g. a "Security Officer") to perform certain administrative operations associated with the locked recovery data. Accordingly, the dual sign-on requirement may ensure that certain administrative actions are under the purview and control of a higher authority above and beyond the system administrator.

In 405, the system may restore the recovery backup data and/or the recovery application data to a sandboxed environment (e.g. sandboxed environment 220). For example, the system may restore at least one of the recovery backup data and the recovery application data to the sandboxed environment. In some embodiments, restoring the recovery backup data may include creating a secure and isolated recovery instance of the backup data (e.g. recovery instance of the backup data 271), and restoring the recovery application data may include creating a secure and isolated recovery instance of the application data (e.g. recovery instance of the application data 273). In addition, in some embodiments, restoring the application data may further include installing the backup application to the sandboxed environment using the recovery application data to create a secure and isolated recovery instance of the backup application (e.g. recovery instance of backup application 275).

In 406, the system may perform, within the sandboxed environment, one or more tests associated with a security threat for at least one of the recovery instances of the backup data, application data, and the backup application. In some embodiments, the sandboxed environment may include at least a secure partition within the isolated recovery system.

In 407, the system may provide the recovery data to the backup production system. For example, the system may provide the secure and isolated recovery instance of the backup data from the isolated recovery system to the production system if a request to recover the backup data is received. Similarly, the system may provide the secure and isolated recovery instance of the backup application from the isolated recovery system to the production system if a request to recover the backup application is received.

Accordingly, in some embodiments, the method may minimize the breadth of potential attack vectors to data protection assets and provide a secure process for recovering critical data for such assets.

Figure 5:
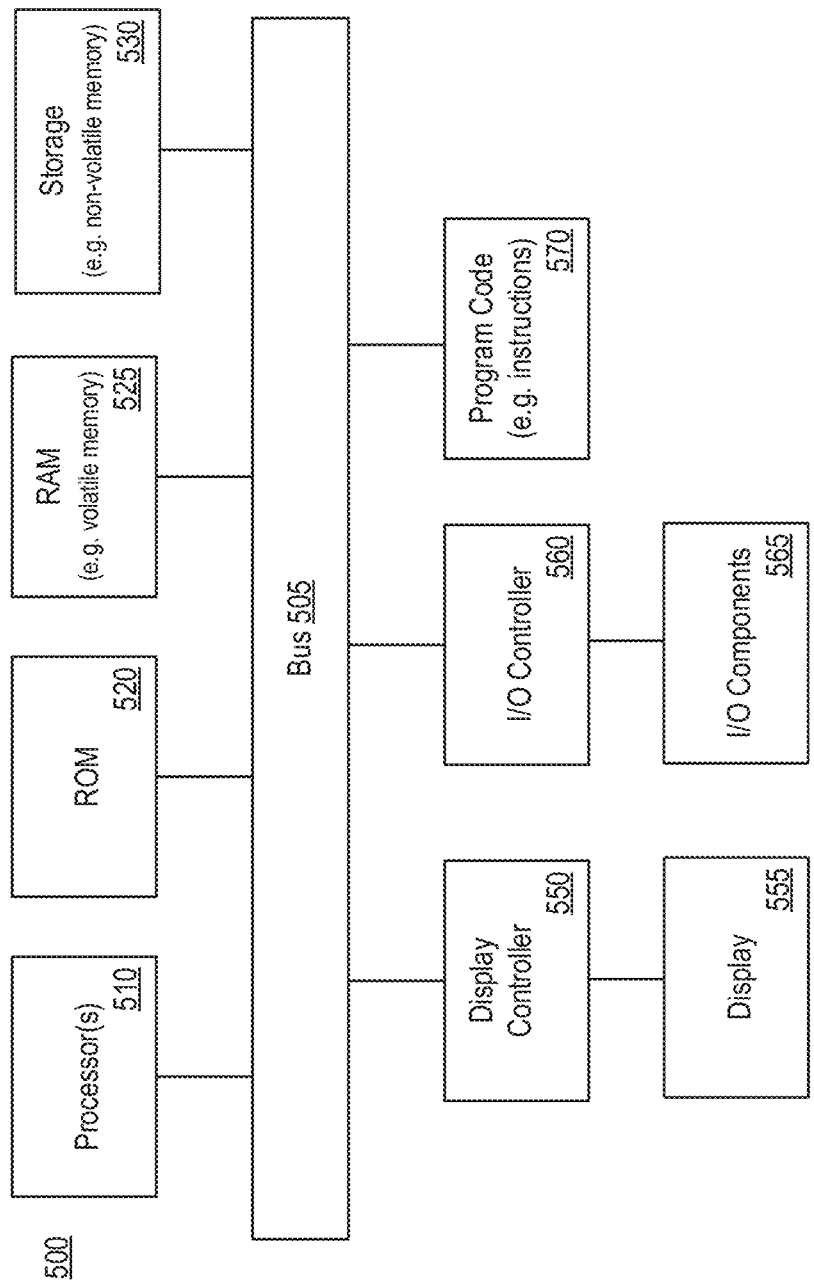
FIG. 5 is a block diagram illustrating an example of a computing system that may be used in conjunction with one or more embodiments of the disclosure.

FIG. 5 shows a block diagram of an example of a computing system that may be used in conjunction with one or more embodiments of the disclosure. For example, computing system 500 (or system, or server, or computing device, or device) may represent any of the devices or systems (e.g. recovery automation manager 170, isolated recovery system 102, storage system 150, etc.) described herein that perform any of the processes, operations, or methods of the disclosure. Note that while the computing system 500 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 500 may include a bus 505 which may be coupled to a processor 510, ROM (Read Only Memory) 520, RAM (or volatile memory) 525, and storage (or non-volatile memory) 530. The processor(s) 510 may retrieve stored instructions from one or more of the memories 520, 525, and 530 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 510 may perform operations in an on-demand or "cloud computing" environment or as a service (e.g. within a "software as a service" (SaaS) implementation). Accordingly, the performance of operations may be distributed among the one or more processors 510, whether residing only within a single machine or deployed across a number of machines. For example, the one or more processors 510 may be located in a single geographic location (e.g. within a home environment, an office environment, or a server farm), or may be distributed across a number of geographic locations. The RAM 525 may be implemented as, for example, dynamic RAM (DRAM), or other types of memory that require power continually in order to refresh or maintain the data in the memory. Storage 530 may include, for example, magnetic, semiconductor, tape, optical, removable, non-removable, and other types of storage that maintain data even after power is removed from the system. It should be appreciated that storage 530 may be remote from the system (e.g. accessible via a network).

A display controller 550 may be coupled to the bus 505 in order to receive display data to be displayed on a display device 555, which can display any one of the user interface features or embodiments described herein and may be a local or a remote display device. The computing system 500 may also include one or more input/output (I/O) components 565 including mice, keyboards, touch screen, network interfaces, printers, speakers, and other devices. Typically, the input/output components 565 are coupled to the system through an input/output controller 560.

Program code 570 may represent any of the instructions, applications, software, libraries, toolkits, modules, components, engines, units, functions, logic, etc. as described herein (e.g. recovery automation manager 170). Program code 570 may reside, completely or at least partially, within the memories described herein (e.g. non-transitory computer-readable media), or within a processor during execution thereof by the computing system. Program code 570 may include both machine code, such as produced by a compiler, and files containing higher-level or intermediate code that may be executed by a computing system or other data processing apparatus (or machine) using an interpreter. In addition, program code 570 can be implemented as software, firmware, or functional circuitry within the computing system, or as combinations thereof. Program code 570 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
one or more processors; and
a non-transitory computer readable medium storing a plurality of instructions, which when executed, cause the one or more processors to:
activate a data connection between a production backup system and an isolated recovery system, the production backup system storing backup data associated with a source system and application data associated with a backup application that manages the backup data, the isolated recovery system storing recovery backup data comprising a copy of the backup data and recovery application data comprising a copy of the application data;
initiate a transfer of data, via the activated data connection and from the production backup system to the isolated recovery system, that synchronizes the recovery backup data with the backup data and the recovery application data with the application data;
deactivate, in response to determining the synchronization is complete, the data connection between the production backup system and the isolated recovery system to prevent access to the isolated recovery system from the production environment;
apply a retention lock to at least one of the recovery backup data and the recovery application data stored by the isolated recovery system; and
restore at least one of the recovery backup data and the recovery application data to a sandboxed environment within the isolated recovery system, restoring the recovery backup data includes creating a recovery instance of the backup data, and restoring the recovery application data includes creating a recovery instance of the application data.

2. The system of claim 1, wherein restoring the application data further includes installing the backup application to the sandboxed environment using the recovery application data to create a recovery instance of the backup application.

3. The system of claim 2, wherein the plurality of instructions, when executed, further cause the one or more processors to:
perform, within the sandboxed environment, one or more tests associated with a security threat for at least one of the recovery instances of the backup data, application data, and the backup application.

4. The system of claim 3, wherein the plurality of instructions, when executed, further cause the one or more processors to:
provide the recovery instance of the backup data from the isolated recovery system to the production backup system if a request to recover the backup data is received; and
provide the recovery instance of the backup application from the isolated recovery system to the production system if a request to recover the backup application is received.

5. The system of claim 1, wherein applying the retention lock includes requiring a dual sign-on or verification procedure to perform administrative operations associated with the locked recovery data.

6. The system of claim 1, wherein the sandboxed environment includes at least a secure partition within the isolated recovery system.

7. The system of claim 1, wherein the recovery backup data and the recovery application data are stored as part of a set of copies that correspond to the backup data and the application data at a set of time points.

8. A method comprising:
activating a data connection between a production backup system and an isolated recovery system, the production backup system storing backup data associated with a source system and application data associated with a backup application that manages the backup data, the isolated recovery system storing recovery backup data comprising a copy of the backup data and recovery application data comprising a copy of the application data;
initiating a transfer of data, via the activated data connection and from the production backup system to the isolated recovery system, that synchronizes the recovery backup data with the backup data and the recovery application data with the application data;
deactivating, in response to determining the synchronization is complete, the data connection between the production backup system and the isolated recovery system to prevent access to the isolated recovery system from the production environment;
applying a retention lock to at least one of the recovery backup data and the recovery application data stored by the isolated recovery system; and
restoring at least one of the recovery backup data and the recovery application data to a sandboxed environment within the isolated recovery system, restoring the recovery backup data includes creating a recovery instance of the backup data, and restoring the recovery application data includes creating a recovery instance of the application data.

9. The method of claim 8, wherein restoring the application data further includes installing the backup application to the sandboxed environment using the recovery application data to create a recovery instance of the backup application.

10. The method of claim 9, further comprising:
performing, within the sandboxed environment, one or more tests associated with a security threat for at least one of the recovery instances of the backup data, application data, and the backup application.

11. The method of claim 10, further comprising:
providing the recovery instance of the backup data from the isolated recovery system to the production backup system if a request to recover the backup data is received; and
providing the recovery instance of the backup application from the isolated recovery system to the production system if a request to recover the backup application is received.

12. The method of claim 8, wherein applying the retention lock includes requiring a dual sign-on or verification procedure to perform administrative operations associated with the locked recovery data.

13. The method of claim 8, wherein the sandboxed environment includes at least a secure partition within the isolated recovery system.

14. The method of claim 8, wherein the recovery backup data and the recovery application data are stored as part of a set of copies that correspond to the backup data and the application data at a set of time points.

15. A computer program product comprising a non-transitory computer-readable medium having a computer-readable program code embodied therein to be executed by one or more processors, the program code including instructions to:
  activate a data connection between a production backup system and an isolated recovery system, the production backup system storing backup data associated with a source system and application data associated with a backup application that manages the backup data, the isolated recovery system storing recovery backup data comprising a copy of the backup data and recovery application data comprising a copy of the application data;
  initiate a transfer of data, via the activated data connection and from the production backup system to the isolated recovery system, that synchronizes the recovery backup data with the backup data and the recovery application data with the application data;
  deactivate, in response to determining the synchronization is complete, the data connection between the production backup system and the isolated recovery system to prevent access to the isolated recovery system from the production environment;
  apply a retention lock to at least one of the recovery backup data and the recovery application data stored by the isolated recovery system; and
  restore at least one of the recovery backup data and the recovery application data to a sandboxed environment within the isolated recovery system, restoring the recovery backup data includes creating a recovery instance of the backup data, and restoring the recovery application data includes creating a recovery instance of the application data.

16. The computer program product of claim 15, wherein restoring the application data further includes installing the backup application to the sandboxed environment using the recovery application data to create a recovery instance of the backup application.

17. The computer program product of claim 16, wherein the program code includes further instructions to:
  perform, within the sandboxed environment, one or more tests associated with a security threat for at least one of the recovery instances of the backup data, application data, and the backup application.

18. The computer program product of claim 17, wherein the program code includes further instructions to:
  provide the recovery instance of the backup data from the isolated recovery system to the production backup system if a request to recover the backup data is received; and
  provide the recovery instance of the backup application from the isolated recovery system to the production system if a request to recover the backup application is received.

19. The computer program product of claim 15, wherein applying the retention lock includes requiring a dual sign-on or verification procedure to perform administrative operations associated with the locked recovery data.

20. The computer program product of claim 15, wherein the sandboxed environment includes at least a secure partition within the isolated recovery system.

* * * * *